United States Patent [19]
Venezia

[11] 4,099,021
[45] Jul. 4, 1978

[54] METHOD OF SPLICING HIGH VOLTAGE SHIELDED CABLES AND SPLICE CONNECTOR THEREFOR

[75] Inventor: J. William Venezia, Budd Lake, N.J.

[73] Assignee: Amerace Corporation, New York, N.Y.

[21] Appl. No.: 31,500

[22] Filed: Apr. 24, 1970

[51] Int. Cl.² ............... H02G 15/08; H01R 5/10; H02G 1/14
[52] U.S. Cl. ................... 174/73 R; 29/628; 339/60 R; 339/258 RR
[58] Field of Search .......... 174/73 R, 73 SC, 75 D, 174/78, 80, 84 R, 84 C, 84 S, 88 R, 88 C, 88 S, 91, 93; 339/59 R, 60 R, 60 C, 61 R, 94 R, 94 C, 116 R, 116 C, 143 R, 143 C, 258 RR, 259 R; 156/49; 29/628, 629, 630 F; 285/90, 404

[56] References Cited

U.S. PATENT DOCUMENTS

| | | | |
|---|---|---|---|
| 1,829,101 | 10/1931 | McGeorge | 285/90 |
| 2,272,222 | 2/1942 | Mullen | 285/90 X |
| 2,533,343 | 12/1950 | Bac | 339/259 R |
| 2,996,567 | 8/1961 | Channell et al. | 174/91 X |
| 3,187,088 | 6/1965 | Warner | 174/91 |
| 3,243,756 | 3/1966 | Ruete et al. | 174/73 R X |
| 3,290,428 | 12/1966 | Yonkers | 174/73 R |
| 3,344,391 | 9/1967 | Ruete | 174/73 R UX |
| 3,453,372 | 7/1969 | Gahir et al. | 174/73 R UX |
| 3,499,100 | 3/1970 | O'Mara | 174/73 R |
| 3,590,138 | 6/1971 | Sugimoto et al. | 174/73 R X |
| 3,692,922 | 9/1972 | Sugimoto et al. | 174/73 R |

FOREIGN PATENT DOCUMENTS

| | | | |
|---|---|---|---|
| 1,192,917 | 4/1959 | France | 285/404 |
| 852,565 | 10/1952 | Fed. Rep. of Germany | 174/91 |
| 522,807 | 4/1931 | Fed. Rep. of Germany | 339/258 RR |
| 107,258 | 6/1917 | United Kingdom | 174/73 R |

*Primary Examiner*—Laramie E. Askin

[57] ABSTRACT

A splice connector having component parts capable of assembly in the field for providing a splice connection between a pair of high voltage shielded electrical cables, the component parts including an electrical connector element to be crimped onto the conductors of the cables, a housing including a pair of elastomeric housing members to be slipped over the cables and assembled over the connector element, a pair of elastomeric sleeves to be placed between the housing and the cables, a retainer ring for retaining each sleeve in place during assembly of the housing over the sleeves, and a heat conductive member for making contact between the electrical connector element and the housing for dissipating heat from the connector element to the housing. A method of making the splice connection wherein the housing members are first placed over the cables, the sleeves are located on the cables, the retainer rings are affixed to the cables to secure the sleeves in place, the connector element is crimped in place to effect an electrical connection and the housing members are pulled over the sleeves and assembled with one another to seal the connection within the assembled housing.

21 Claims, 10 Drawing Figures

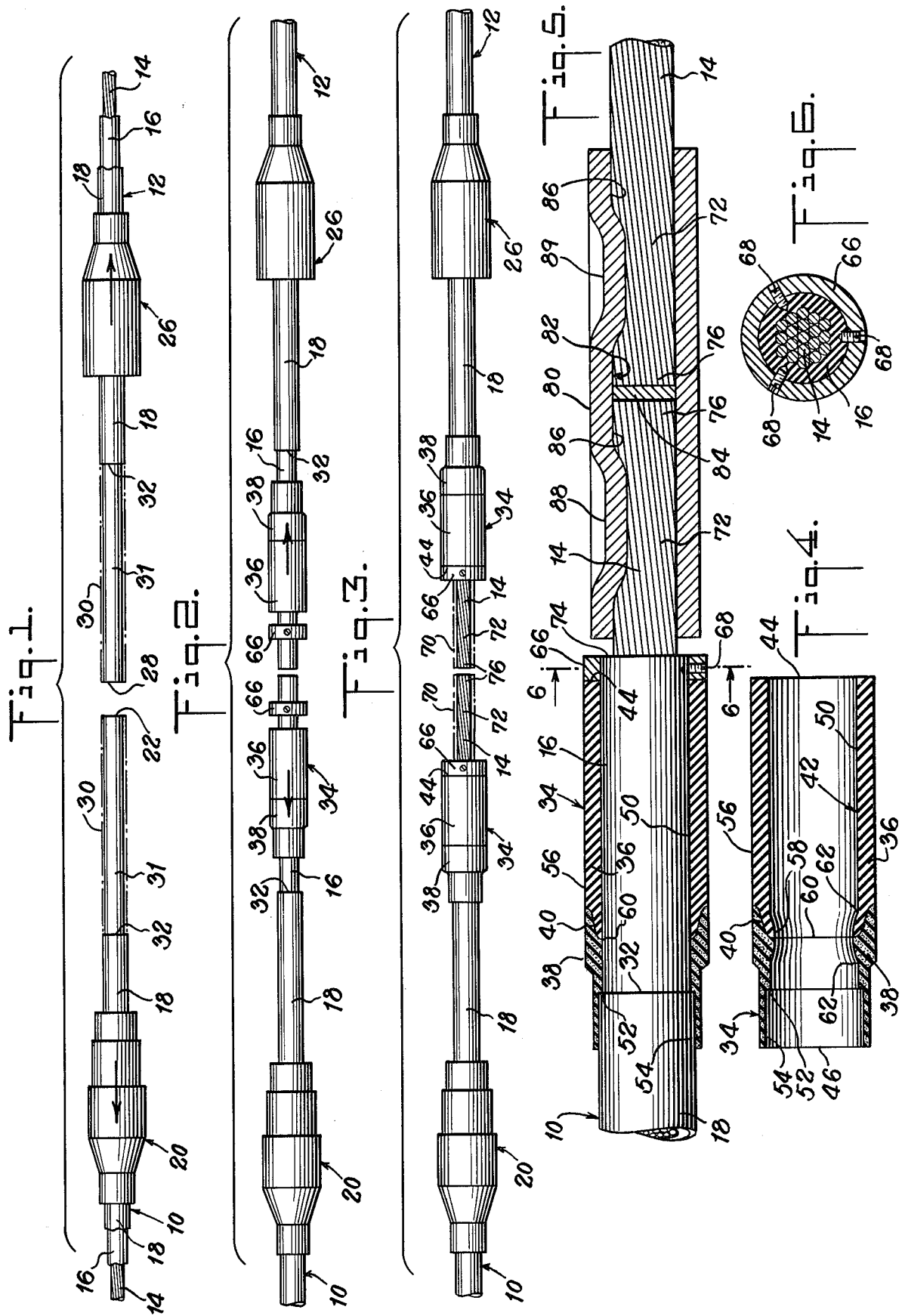

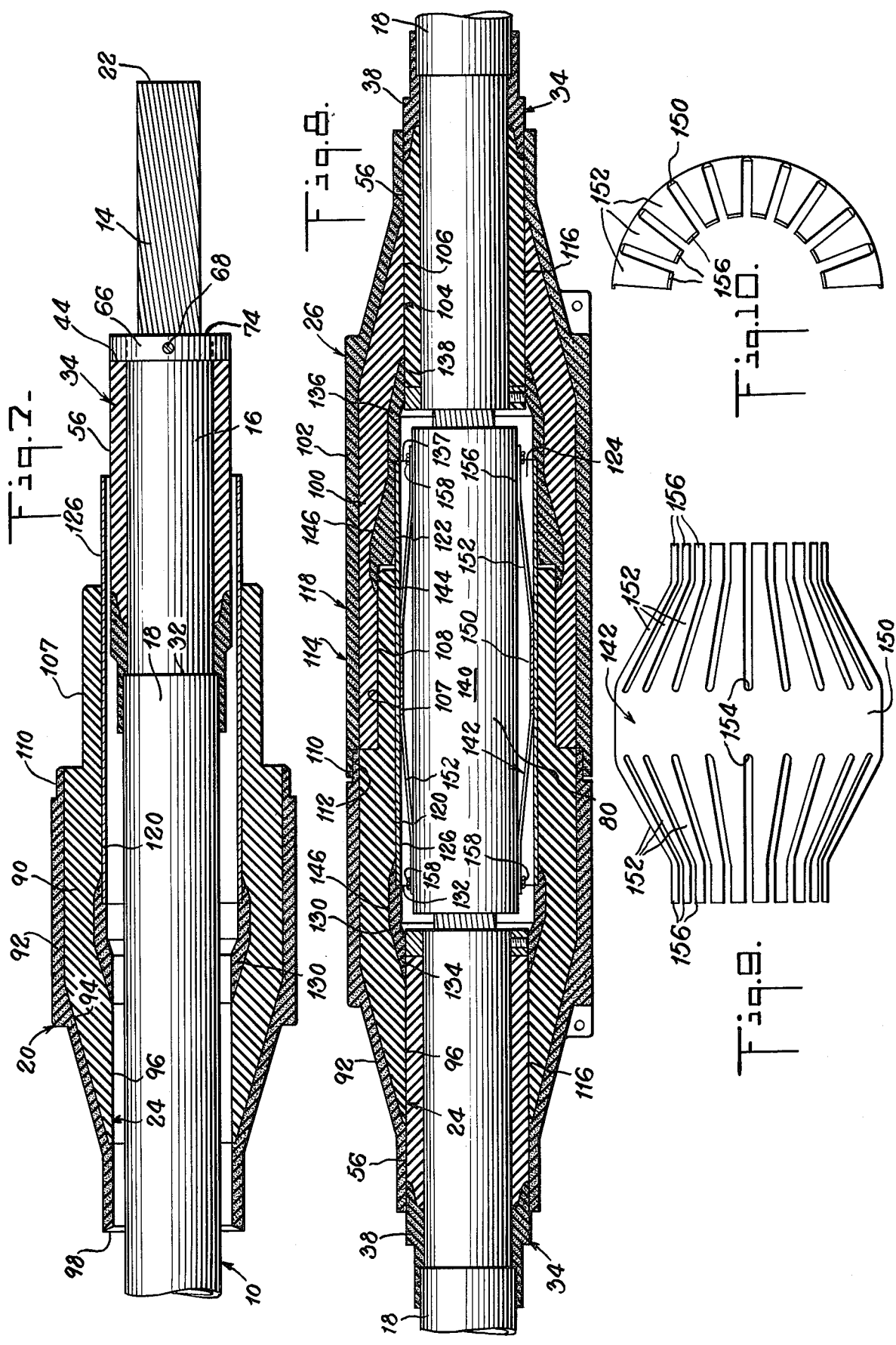

METHOD OF SPLICING HIGH VOLTAGE SHIELDED CABLES AND SPLICE CONNECTOR THEREFOR

The present invention relates generally to electrical connections and pertains, more specifically, to an electrical connector for providing a splice connection, in the field, between high voltage shielded electrical cables in power distribution systems and to a method of making such a splice connection.

In recent years, heavy emphasis has been placed upon the development of underground electrical power distribution systems, especially in light industrial, commercial and residential areas. Various power distribution components, such as shielded electrical cables, transformers and electrical connectors have been evolved for use in such systems.

Among these components, shielded electrical connectors have been developed which are easily assembled in the field at the terminal ends of electrical cables so as to facilitate the construction and installation of underground power distribution systems. For the most part, these connections have been of the type which is selectively disconnectable for the purpose of periodic maintenance of the system. However, not all connections in power distribution systems need be of the disconnectable type and it would be advantageous to have available a connector having component parts readily assembled in the field for making a reliable splice connection between shielded power cables and a method for making such splice connections.

It is therefore an important object of the invention to provide an electrical connector having component parts capable of ready assembly in the field to establish a reliable splice connection between electrical cables.

Another object of the invention is to provide a method wherein the making of a splice connection between shielded electrical cables in the field is simplified.

Another object of the invention is to provide a splice connection which can be assembled readily in the field without the necessity of performing tedious operations such as taping, molding, potting or like procedures.

Still another object of the invention is to provide an electrical connector of the type described above wherein a selected sleeve is placed upon the cable after slipping a corresponding connector housing over the cable and a retainer positively secures the sleeve in place during subsequent assembly of the housing with the sleeve.

A further object of the invention is to provide an electrical connector of the type described above wherein certain of the component parts may be employed with cables of different diameters by selection of any of a plurality of interchangeable sleeves for a particular splice connection.

A still further object of the invention is to provide an electrical connector of the type described above wherein a member of heat conductive material effectively dissipates heat from the connection between cable conductors to the external housing of the splice connection.

Another object of the invention is to provide a construction in a composite elastomeric sleeve which includes a portion of insulating elastomeric material, a portion of conductive elastomeric material and a junction between the portions, means for assuring that, upon placement of the sleeve at the terminus of a shielded high voltage electrical cable, the junction will engage the cable in intimate, essentially void-free contact.

Still another object of the invention is to provide a splice connector for electrical power distribution cables which is relatively simple and inexpensive to manufacture.

The above objects, as well as still further objects and advantages, are attained by the invention which may be described briefly as a splice connector having component parts capable of being assembled in the field at the terminus of high voltage shielded electrical cables for providing a splice connection between first and second such cables, the cables each having a conductor surrounded by an insulating jacket within a conductive shield, the shield of each cable terminating short of the cable terminus to expose a portion of the insulating jacket between the terminus and the termination of the shield, and the insulating jacket terminating short of the cable terminus to expose the conductor between the terminus and the termination of the insulating jacket, the splice connector comprising a pair of sleeves of elastomeric material, the sleeves each having a first portion of insulating elastomeric material, a second portion of conductive elastomeric material integral with and axially related to the first sleeve portion, an axially extending external surface common to the first and second sleeve portions, and a resiliently dilatable internal bore extending axially from end to end of the sleeve through both the first and second sleeve portions, the bore having an internal surface adjacent one end of the sleeve and coextensive with said first sleeve portion and at least part of the second sleeve portion, the relative dimensions of said internal surface and the outer surface of the insulating jacket being such that the bore at the internal surface thereof will be resiliently dilated and the corresponding portion of the sleeve will grip the insulating jacket to increase the dielectric strength of the creep path along said corresponding portion of the insulating jacket, a pair of retainers for being affixed one to each insulating jacket at the termination thereof to abut a corresponding sleeve and preclude axial movement of the sleeve along the jacket toward the cable terminus, a housing of elastomeric material, the housing including an inner portion of insulating elastomeric material, an outer portion of conductive elastomeric material integral with the inner portion, and an internal bore extending from end to end of the housing, the bore of the housing having resiliently dilatable portions common with the inner and outer housing portions, the relative dimensions of the housing bore portions and the external surfaces of each corresponding sleeve being such that the housing bore portions will be dilated to grip the external surface of each corresponding sleeve in watertight relationship therewith with the outer portion in electrical contact with the second portion of the sleeve, and a further bore portion, the further bore portion of the housing establishing a closed chamber within the housing when the housing cooperates with the sleeves, the chamber including a wall of electrically conductive material contiguous with the further bore portion of the housing and radially surrounding the chamber, connector means for electrically connecting the conductors within the chamber at the terminus of the cables, and a member of resilient electrically conductive material for making contact between the connector means and the wall of conductive material.

In addition, the invention is concerned with a method of making a splice connection at the terminus of a pair of high voltage shielded electrical cables, each cable having a conductor surrounded by an insulating jacket within a conductive shield, the method comprising placing a housing of elastomeric material over the terminus of a cable and moving the housing along the cable away from the terminus, the housing having an internal bore with an internal diameter larger than the external diameter of the cable so as to enable such movement with essentially no resistance, removing a portion of the shield adjacent the terminus of each cable to expose a portion of the insulating jacket between the terminus and the termination of the shield, placing a composite sleeve of elastomeric material over the exposed portion of each insulating jacket and moving the sleeve away from the cable terminus until a first sleeve portion of conductive elastomeric material at one end of the sleeve is juxtaposed with the termination of the shield, a second sleeve portion of insulating elastomeric material at the other end of the sleeve overlaps the exposed insulating jacket and the other end of the sleeve is spaced from the cable terminus, the sleeve having a resiliently dilatable internal bore such that the second sleeve portion grips the insulating jacket to increase the dielectric strength of the creep path along the insulating jacket, affixing a retainer upon each insulating jacket in abutment with the other end of each sleeve to preclude movement of the sleeve toward the cable terminus, removing a portion of each insulating jacket between the retainer and the cable terminus to expose the conductor adjacent the terminus, effecting an electrical connection between the exposed conductors of the pair of cables, and moving the housing toward the terminus to engage the internal bore of the housing with the sleeves and seal the electrical connection within the housing.

The invention will be more fully understood, while still further objects and advantages will become apparent, by reference to the following detailed description of an embodiment of the invention illustrated in the accompanying drawing, in which:

FIGS. 1 through 3 are diagrammatic views illustrating the assembly of a splice connection utilizing the method of the invention and a splice connector constructed in accordance with the invention;

FIG. 4 is a longitudinal cross-sectional view of an adaptor sleeve of the connector;

FIG. 5 is a longitudinal cross-sectional view of the adaptor sleeve installed upon a cable;

FIG. 6 is a cross-sectional view taken along line 6—6 of FIG. 5;

FIG. 7 is a longitudinal cross-sectional view showing a housing member being assembled into place upon the adaptor sleeve;

FIG. 8 is a cross-sectional view of the fully assembled splice connection;

FIG. 9 is a plan view of the heat conductive member of the splice connection; and FIG. 10 is an end view of the heat conductive member.

Referring now to the drawing, and especially to FIGS. 1 through 3 thereof, a splice connection is to be made in accordance with the invention between a pair of high voltage shielded electrical cables 10 and 12 in a power distribution system. Each of the cables 10 and 12 has a central conductor 14 surrounded by an insulating jacket 16 which itself lies within an external shield 18. In order to effect a splice connection between the terminal ends of the cables, a first, or plug, housing member 20 is slipped over the terminus 22 of cable 10 and is moved along the cable away from the terminus thereof. Such movement of the housing member 20 along the cable 10 is accomplished with little or no resistance since the housing member is provided with an axially extending internal bore 24 (see FIG. 7) having an internal diameter considerably larger than the overall external diameter of the cable. Likewise, a second, or receptacle, housing member 26 is slipped over the terminus 28 of cable 12 and is advanced along the cable in a direction away from the terminus thereof.

A portion 30 of each shield 18 is removed so as to expose a portion 31 of the insulating jacket 16 between each terminus and the termination 32 of the shield. While the portion 30 of the shield 18 may be removed either prior to or subsequent to slipping the housing members 20 and 26 onto the cables 10 and 12, it is preferable to remove the shield portion 30 after the housing members have been slipped onto the cables, as shown in FIG. 1.

As best seen in FIG. 2, a pair of sleeves 34 are subsequently slipped over the terminal ends of the cables, one sleeve 34 upon each cable, and each sleeve is moved along its respective cable in a direction away from the terminus thereof. The sleeves 34 are preferably fabricated of an elastomeric material and include a first sleeve portion 36 of an electrically insulating elastomer, and a second sleeve portion 38 of an electrically conductive elastomer axially related to and integral with the first sleeve portion 36. The sleeve portions 36 and 38 are preferably molded together so that the sleeve portions are contiguous and joined together in a single assembly (also see FIG. 4), the juncture 40 between the sleeve portions being continuous and void-free. Preferably, the compounds of the sleeve portions are based upon the same polymer to assure strong bonding. An ethylene-propylene terpolymer, available under Du Pont's trademark NORDEL, is an example of a polymer which has been successfully used for this purpose. Insulating NORDEL is used for the first sleeve portion 36 and conductive NORDEL is used for the second sleeve portion 38.

Each sleeve 34 has an internal bore 42 (see FIG. 4) which extends axially from end 44 to end 46 of the sleeve 34 through both the first and second sleeve portions, the bore 42 being resiliently dilatable by virtue of the resilient nature of the sleeve material. The internal bore 42 has a first internal surface 50 of a first diameter adjacent end 44 of the sleeve and extending through the first sleeve portion 36 and a part of the second sleeve portion 38 to a shoulder 52 which is located between the first internal surface 50 and a second internal surface 54 adjacent the other end 46 of the sleeve and having a diameter slightly larger than the diameter of the first internal surface. The relative dimensions of the first internal surface 50 and the diameter of the external surface of insulating jacket 16 are such that the insulating jacket 16 may be inserted into the sleeve 34 by hand, the resilient property of the sleeve permitting the sleeve to be radially expansible thereby allowing a slight dilation of the internal bore 42 to admit the insulating jacket (also see FIG. 5). Thus, the internal bore 42, along the first surface 50 thereof, will grip the exposed length 31 of the insulating jacket 16 in a tight fit. The tight fit along the exposed length of the insulating jacket increases the dielectric strength of the creep path along the outer surface of the insulating jacket between the end 44 of the sleeve and the termination 32 of the shield 18 to assure that current will not pass between the conductor 14 and the shield 18 along the insulating jacket 16. Movement of the sleeve 34 along the cable is continued until the shoulder 52 abuts the termination 32 of the shield 18 (as shown in FIG. 5). At this position of the sleeve, the internal bore 42 is resiliently dilated along the second internal surface 54 thereof to grip the shield 18 in electrical contact therewith. Each sleeve has an external surface 56 common to both portions 36 and 38.

Because there is a tendency for electrical stresses to be concentrated along the juncture 40 between the first and second sleeve portions 36 and 38, and, while the relative dimensions of the internal bore 42 and the external surface of the insulating jacket tend to eliminate voids between the sleeve 34 and the insulating jacket 16, there is a possibility that voids will be present between the sleeve 34 and the insulating jacket 16 once the sleeve is installed (due to irregularities in the external surface of the insulating jacket), the internal bore 42 of each sleeve is provided with a portion 58 of reduced internal diameter along the junction 60 of the internal bore with juncture 40 (see FIG. 4). The portion 58 of normally reduced diameter assures that upon resilient dilation of the internal bore of the sleeve, the internal bore will grip the insulating jacket in intimate, essentially void-free contact at least at the junction 60. The increased pressure of the sleeve upon the insulating jacket established by the reduced diameter at the junction has been found to insure that minor irregularities which might otherwise affect the ionization level of the interface between the sleeve and the insulating jacket will essentially be eliminated. While the reduced diameter at the junction 60 will increase the resistance to movement of the sleeve 34 along the insulating jacket 16, this resistance is minimized by localizing the reduced diameter portion 56 to the area of the junction. In order to further facilitate movement of the sleeve on the insulating jacket while at the same time assuring that air is expelled from the vicinity of the junction 60 so that intimate, essentially void-free contact is attained, the portion 58 of reduced internal diameter is provided with a profile contour which tapers by gradually increasing in diameter from the junction 60 itself toward both ends 62 of the portion 58. Preferably, the profile contour is primarily arcuate. Thus, electrical stresses at the junction 60 are controlled.

Once the sleeves 34 are in proper position upon their respective cables, a retainer shown in the form of retaining ring 66 is slipped over the terminus of each cable, as seen in FIG. 2, and affixed to the insulating jacket 16 in abutting relationship with the end 44 of each sleeve, as shown in FIG. 3. Each retaining ring 66 is preferably anchored to the insulating jacket 16 by fastener means shown in the form of set screws 68 (see FIGS. 5 and 6) which positively engage the insulating jacket 16 to anchor the ring 66 in place. The set screws 68 are threaded radially through each ring 66 to radially enter the jacket 16 and may, but need not necessarily contact the conductor 14 of the cable. Each sleeve 34 is thus positively retained against movement toward the cable terminus by a retaining ring 66. Movement in the opposite direction is restrained by abutment of the shoulder 52 with the termination 32 of a shield 18. Thus, each sleeve 34 presents an external surface 56 of prescribed external diameter common to both the first and second sleeve portions and the termination 32 of the shield 18 is encased and protected by the second sleeve portion 38 while the shield 18 is electrically connected with the external surface 56 of prescribed diameter.

A portion 70 of the insulating jacket 16 adjacent the terminus of each cable is removed to expose a length 72 of conductor 14 between each terminus 22 and 28 and the termination 74 of the insulating jacket (see FIGS. 3 and 5). While these portions 70 may be removed either before or after the installation of the sleeves 34 and the retaining rings 66, removal is preferably effected subsequent to the installation of the retaining rings so that the retaining rings may serve as guides for the location of the termination 74 of the insulating jacket 16.

The bared ends 76 of the conductors 14 are then electrically connected by means of an electrical connector element shown in the form of a tubular metallic contact 80 having a longitudinal aperture 82 divided by a transverse wall 84 to establish a pair of ferrules 86. Each conductor 14 is inserted into its respective ferrule 86 and the contact 80 is crimped at 88 and 89 (see FIG. 5) to affix the contact 80 to the conductors 14 in a well-known manner.

Turning now to FIG. 7, the first housing member 20 is seen to have a composite construction fabricated of an elastomeric material. The composite structure includes an inner portion 90 of an electrically insulating elastomer and an outer portion 92 of an electrically conductive elastomer. The inner and outer portions 90 and 92 are preferably molded together, such as by molding the inner portion first and then molding the outer portion around the inner portion to form the composite housing member, so that the housing member 20 is an integral structure having contiguous inner and outer portions joined in a single assembly, the juncture 94 between the inner and outer portions 90 and 92 being continuous and void-free to enable electrical stresses to be kept within control along the length of the housing member. Both housing members 20 and 26 are preferably fabricated of the same materials employed in the fabrication of the sleeves 34.

The internal bore 24 of the first housing member 20 has a first portion 96 common with and extending axially through the inner and outer portions 90 and 92 adjacent one end 98 of the housing member. The relative dimensions of the first portion 96 of the internal bore 24 and the external surface 56 of the corresponding sleeve 34 are such that as the housing member 20 is moved toward the cable terminus 22 and over the sleeve 34, the internal bore portion 96 is resiliently dilated to grip the external surface 56 in watertight relationship therewith.

As best seen in FIG. 8, the second housing member 26 is also a composite structure including an inner portion 100 and an outer portion 102, and the internal bore 104 thereof is likewise common to both the inner portion 100 and the outer portion 102, the relative dimensions of the first portion 106 of the internal bore 104 and its corresponding sleeve 34 bearing the same relationship as described above in connection with the first housing member 20 and its corresponding sleeve 34. The housing members 20 and 26 are provided with corresponding portions for cooperating with one another in watertight relationship, such portions being shown in the form of a plug extension 107 of the first housing member 20 and a corresponding receptacle 108 in the second housing member 26. As the housing members are both pulled toward each respective terminus 22 and 28 and thus toward one another, the plug 107 will enter the receptacle 108 to establish a watertight seal between the housing members, as well as to make electrical contact between the outer portions 92 and 102 of the housing members by the engagement of plug portion 110 with receptacle portion 112. The tight fit between the housing members 20 and 26 and their respective sleeves 34 assures that the outer portions 92 and 102 grip the respective second sleeve portions 38 to make electrical contact therewith and thus assure electrical continuity of the shield 18 across the completed splice connection 114. At the same time, the tight fit increases the dielectric strength of the creep path along the portion 116 of the external surface 56 of the sleeve which is contiguous with the inner portion of each housing member.

The internal bores 24 and 104, respectively, of the housing members 20 and 26 each have a second bore portion 120 and 122, respectively, which, when the housing members are assembled in an integral housing assembly 118 over the sleeves 34 as seen in FIG. 8, establish a closed chamber 124 within which the contact 80 is housed and sealed. An electrically conductive and heat conductive metallic tube 126 (see FIGS. 7 and 8) is located within the second bore portion 120 of the first housing member 20 and enters the second bore portion 122 of the second housing member 26 upon assembly of the housing members. Tube 126 is relatively rigid and provides an internal support for plug 107 to assure a tight seal between plug 107 and receptacle 108 and is preferably fabricated of aluminum. The first housing member is provided with a bridging portion 130 of electrically conductive elastomeric material which extends between one end 132 of the metallic tube 126 and a part 134 of the first bore portion 96. Likewise, the second housing member 26 includes a bridging portion 136 of electrically conductive elastomeric material extending between the other end 137 of the metallic tube 126 and a part 138 of the first bore portion 106 of the internal bore 104 of that housing member. Thus, when the housing members are assembled in the integral housing assembly 118, as seen in FIG. 8, the closed chamber 124 is surrounded by a wall of electrically conductive and heat conductive material extending coaxially with the contact 80 and the conductors 14 and spaced radially from the outer surface 140 of the contact. While it is contemplated that the housing assembly 118 may be supplied in the form of a unitary housing, it has been found preferable to assemble the housing in the field from a pair of housing members, as described above.

Prior to the assembly of the two housing members 20 and 26 and the consequent closing of the chamber 124, a member of heat conductive material, illustrated in FIGS. 8 through 10 in the form of metallic member 142, is placed upon the outer surface 140 of the contact 80 such that upon assembly of the housing members and the closing of the chamber the conductive member 142 will contact both the electrical contact 80 and the metallic tube 126 to provide a path for the conduction of heat across the gap between the contact and the tube thereby enabling dissipation of excessive heat from the contact 80 and increasing the effective capacity of the splice connection 114. At the same time, the conductive member 142 is electrically conductive and thus eliminates any deleterious potential difference between the wall of the chamber 124 and the contact 80 and conductors 14. Bridging portion 136 of the second housing member 26 is also continued around the bottom of the receptacle 108 at 144 so as to eliminate deleterious electrical stresses across any gap between the end of the plug 107 and the bottom of the receptacle 108. The bridging portions 130 and 136 are preferably integrally molded with the inner portions 90 and 100 of the respective housing members 20 and 26 so as to provide a contiguous and void-free juncture 146 between each bridging portion and its respective inner portion.

As best seen in FIGS. 8, 9 and 10, the conductive member 142 is preferably in the form of a resilient arcuate band 150 of metal having a radius which is normally greater than the radius of the cylindrical outer surface 140 of the contact 80 and greater than the inner cylindrical surface of the metallic tube 126. A plurality of resilient fingers 152 project from both ends 154 of the metallic band 150, and are unitary therewith, each finger 152 extending axially from the end of the band to terminate at a free tip 156. The free tips 156 of the fingers 152 lie along an arc having a circumferential length smaller than the circumferential length of the arc of the band 150 and extend axially parallel to one another such that the metallic member 142 may be wrapped around the outer surface 140 of the contact 80 with the tips 156 of the fingers 152 contacting the outer surface of the contact 80 and with the band 150 in position to contact the metallic tube 126. The finger tips 156 are preferably positively affixed to the contact 80 by means of a relatively short length of wire or tape wrapped around the finger tips at 158, as seen in FIG. 8. Thus, upon assembling the housing members 20 and 26 over the conductive member 140, an effective heat conducting path is provided between the contact 80 and the tube 126 within the assembled housing 118. In this manner, heat from the contact may be conducted directly to the tube and thereby dissipated to the surrounding housing.

The combination of the housing 118 with the corresponding sleeves 34 enables ready assembly in the field since the sleeves 34, which incorporate thin wall sections relative to the corresponding wall sections of the housing, are easily placed in proper position upon the cables by hand without damage to the cable and especially to the shield. The greater forces needed to pull the housing or housing members over the sleeves are easily applied to the larger diameter housing or housing members. The sleeves 34, being secured against movement in response to such pulling forces by virtue of the retaining rings 66, can withstand such pulling forces and the pulling forces need not be applied directly to the more delicate shield 18. In addition, cables of different diameters may be accommodated without changing the size or configuration of the housing by merely providing sleeves 34 having internal bores of various diameters while maintaining the external surfaces 56 of the sleeves at the same diameter. In certain instances, it may be desirable to have cable 10 differ in size from cable 12 and such a difference is easily accommodated by employing sleeves 34 of different diameter internal bores. Thus, by selecting the proper sleeves 34 the splice connector may be adapted to accommodate a wide variety of cable sizes.

The above detailed description of a preferred embodiment of the invention is provided by way of example only. Various details of design and construction may be modified without departing from the true spirit and scope of the invention as defined in the appended claims.

The embodiments of the invention in which an exclusive property or privilege is claimed are defined as follows:

1. A splice connector having component parts capable of being assembled in the field at the terminus of high voltage shielded electrical cables for providing a splice connection between first and second such cables, said cables each having a conductor surrounded by an insulating jacket within a conductive shield, the shield of each cable terminating short of the cable terminus to expose a portion of the insulating jacket between the terminus and the termination of the shield, and the insulating jacket terminating short of the cable terminus to expose the conductor between the terminus and the termination of the insulating jacket, said splice connector comprising:

a pair of sleeves of elastomeric material, said sleeves each having a first portion of insulating elastomeric material, a second portion of conductive elastomeric material integral with and axially related to said first sleeve portion, an axially extending external surface common to said first and second sleeve portions, and a resiliently dilatable internal bore extending axially from end to end of the sleeve through both said first and second sleeve portions, said bore having an internal surface adjacent one end of the sleeve and coextensive with said first sleeve portion and at least part of said second sleeve portion, the relative dimensions of said internal surface and the outer surface of the insulating jacket being such that the bore at the internal surface thereof is resiliently dilated and the corresponding portion of the sleeve grips the insulating jacket to increase the dielectric strength of the creep path along said corresponding portion of the insulating jacket;

a pair of retainers affixed one to each cable in position for abutting a corresponding sleeve so as to maintain each corresponding sleeve in a substantially fixed position on the insulating jacket and to preclude axial movement of the sleeve along the jacket toward the cable terminus;

a pair of housing members of elastomeric material, said housing members having corresponding portions cooperating with one another in watertight relationship, said housing members each including an inner portion of insulating elastomeric material, an outer portion of conductive elastomeric material integral with said inner portion, and an internal bore extending from end to end of the housing member, said bore of each housing member having a resiliently dilatable first portion common with said inner and outer housing member portions adjacent one end of the housing member, the relative dimensions of the first portion of the bore of each housing member and said external surface of each corresponding sleeve being such that said first bore portion of each housing member is dilated and grips said external surface of a corresponding sleeve in watertight relationship therewith with said outer portion in electrical contact with the second portion of the sleeve, said internal bore having a further bore portion, said further bore portions of the pair of housing members establishing a closed chamber within said housing; and connector means electrically connecting the conductors within said chamber at the terminus of the cables.

2. The splice connector of claim 1 wherein the internal bore of each said sleeve includes a further internal surface adjacent the other end of the sleeve and coextensive with said second sleeve portion, the relative dimensions of said further internal surface and the outer surface of the shield being such that the bore at the further internal surface thereof is resiliently dilated and the corresponding portion of the sleeve grips the shield in electrical contact therewith.

3. The splice connector of claim 1 wherein each said retainer is a retaining ring.

4. The splice connector of claim 1 wherein each said retainer is a metallic ring and includes fastener means positively securing the ring to the cable.

5. The splice connector of claim 1 wherein said further bore portions establishing said chamber include a wall of heat conductive material contiguous with said further bore portions and radially spaced from said connector means, and said splice connector includes a member of heat conductive material extending between said connector means and said wall of conductive material.

6. The splice connector of claim 5 wherein the wall of conductive material includes a metallic tube.

7. A composite sleeve for placement at the terminus of a shielded high voltage electrical cable, the cable having a conductor surrounded by an insulating jacket within a conductive shield, the shield terminating short of the cable terminus to expose a portion of the insulating jacket between the terminus and the termination of the shield, and the insulating jacket terminating short of the cable terminus to expose the conductor between the terminus and the termination of the insulating jacket, said composite sleeve comprising:

a first sleeve portion of insulating elastomeric material;

a second sleeve portion of conductive elastomeric material integral with and axially related to said first sleeve portion;

an axially extending external surface common to said first and second sleeve portions; and a resiliently dilatable internal bore extending axially from end to end of the sleeve through both said first and second sleeve portions, said bore having an internal diameter adjacent one end of the sleeve and coextensive with said first sleeve portion and at least a part of said second sleeve portion, the relative dimensions of said internal diameter and the diameter of the insulating jacket being such that the bore at said internal diameter thereof will be resiliently dilated and a corresponding portion of the sleeve will grip the insulating jacket to increase the dielectric strength of the creep path along said insulating jacket, and a portion of normally reduced diameter at the junction of said bore with said first and second axial sleeve portions, said bore gradually increasing in diameter to said internal diameter at at least one end of said portion of reduced diameter such that the normally reduced portion will be resiliently dilated to grip the insulating jacket in essentially void-free contact at said junction.

8. The composite sleeve of claim 7 wherein said internal bore includes a further internal diameter adjacent the other end of the sleeve and coextensive with said second sleeve portion, the relative dimensions of said further internal diameter and the diameter of the shield being such that the bore at the further internal diameter thereof will be resiliently dilated and a corresponding portion of the sleeve will grip the shield in electrical contact therewith.

9. The composite sleeve of claim 7 wherein said bore portion of reduced internal diameter includes a profile contour which gradually increases in diameter from said junction toward both ends of said portion of reduced internal diameter.

10. The composite sleeve of claim 9 wherein said profile contour is primarily arcuate.

11. A splice connector having component parts capable of being assembled in the field at the terminus of high voltage shielded electrical cables for providing a splice connection between first and second such cables, said cables each having a conductor surrounded by an insulating jacket within a conductive shield, the splice connector comprising:

a pair of sleeves of elastomeric material, each sleeve of said pair being fitted over the insulating jacket of one of said cables, each said sleeve having an external surface and a resiliently dilated internal bore gripping the insulating jacket to increase the dielectric strength of the creep path along the insulating jacket;

a pair of housing members, said members each having an internal bore including a resiliently dilated portion gripping, in watertight relationship therewith, the corresponding external surface of the corresponding sleeve and a further portion, said further portions of the pair of housing members cooperating with one another to establish a sealed chamber enclosing the terminus of each cable;

electrical contact means making an electrical connection between the conductors of the cables disposed within said sealed chamber;

a pair of retaining rings; and means affixing each of said pair of retaining rings between a corresponding sleeve and the terminus of the corresponding cable in position for abutting the sleeve to maintain each corresponding sleeve in a substantially fixed position on said insulating jacket and to preclude axial movement of the sleeve along the insulating jacket toward the cable terminus.

12. The invention of claim 11 wherein each said ring is a metallic member and said affixing means includes fastener means positively securing the ring to the cable.

13. The invention of claim 11 wherein said affixing means comprises screw threaded fasteners threaded radially through said ring and radially entering said insulating jacket to anchor the ring to the insulating jacket.

14. In combination with a splice connector having component parts capable of being assembled in the field at the terminus of high voltage shielded electrical cables for providing a splice connection between first and second such cables, wherein the conductors of the cables are electrically connected by electrically conductive connector means housed within a closed chamber including an axially extending wall of heat-conductive material spaced radially from the connector means and extending generally coaxial therewith the improvement comprising:

a member of resilient heat-conductive metal having a plurality of axially extending fingers spaced circumferentially around said connector means and making contact between said connector means and said wall of heat-conductive material, the member including a metallic band at least partially encircling the connector means and extending axially between opposite ends and said fingers are unitary with and project axially from each end of said band and terminate at free tips to provide a plurality of heat-conducting paths between the band and the tips.

15. The invention of claim 14 wherein the connector means includes a contact having a generally cylindrical surface, the wall of heat conductive material is generally cylindrical and has a diameter greater than the diameter of said cylindrical surface and the member has an arcuate configuration, said metallic band having a circumferential length greater than the circumferential length of said free tips such that the band will contact said wall of the chamber while the tips of said fingers will contact said surface of the contact.

16. A method of making a splice connection at the terminus of a pair of high voltage shielded electrical cables, each cable having a conductor surrounded by an insulating jacket within a conductive shield, said method comprising:

placing a housing member of elastomeric material over the terminus of each cable and moving each housing member along the cable away from the terminus, each housing member having an internal bore with an internal diameter larger than the external diameter of the cable so as to enable such movement with essentially no resistance;

removing a portion of the shield adjacent the terminus of each cable to expose a portion of the insulating jacket between the terminus and the termination of the shield;

placing a composite sleeve of elastomeric material over the exposed portion of each insulating jacket and moving the sleeve away from the cable terminus until a first sleeve portion of conductive elastomeric material at one end of the sleeve is juxtaposed with the termination of the shield, a second sleeve portion of insulating elastomeric material at the other end of the sleeve overlaps the exposed insulating jacket and said other end of the sleeve is spaced from the cable terminus, said sleeve having a resiliently dilatable internal bore such that the second sleeve portion grips the insulating jacket to increase the dielectric strength of the creep path along the insulating jacket;

affixing a retainer upon each insulating jacket in abutment with said other end of each sleeve to maintain each corresponding sleeve in a substantially fixed position on said insulating jacket and to preclude movement of the sleeve toward the cable terminus;

removing a portion of each insulating jacket between the retainer and the cable terminus to expose the conductor adjacent the terminus;

effecting an electrical connection between the exposed conductors of the pair of cables; and moving the housing members toward one another to engage the internal bore of each housing with a corresponding sleeve and to assemble the housing members to one another and seal the electrical connection within the housing.

17. The method of claim 16 wherein each sleeve is placed over each insulating jacket with the first sleeve portion overlapping the termination of the shield, the resiliently dilatable internal bore of the sleeve being such that the first sleeve portion grips the shield to make electrical contact therewith.

18. The method of claim 16 wherein:

the electrical connection is effected by affixing an axially extending electrical connector element to the cable conductors at the terminus of each cable;

a heat conductive member is affixed to the electrical connector element to extend radially therefrom prior to moving the housing members toward one another; and the housing members are subsequently moved toward one another whereby the heat conductive member establishes a heat conductive path between the electrical connector element and the internal bore of at least one of said housing members to dissipate heat from the electrical connector element to the assembled housing members.

19. A splice connector kit having component parts capable of being assembled in the field at the terminus of high voltage shielded electrical cables for providing a splice connection between first and second such cables, said cables each having a conductor surrounded by an insulating jacket within a conductive shield wherein a portion of the conductive shield is removed to expose the insulating jacket and a portion of the insulating jacket is removed to expose the conductor at the terminus of the cable, the kit comprising the combination of:

a pair of sleeves of elastomeric material, each sleeve of said pair adapted to be fitted over the insulating jacket of one of said cables, each said sleeve having an external surface and a resiliently dilatable internal bore for gripping the insulating jacket to increase the dielectric strength of the creep path along the insulating jacket;

electrical contact means adapted to be affixed to the terminus of each exposed conductor for joining the conductors and making an electrical connection therebetween;

a pair of retaining members adapted to be positioned respectively between each of said sleeves fitted over the insulating jacket of each said cable and the corresponding terminus of each said cable, said retaining members each having means cooperatively associated therewith for maintaining each said member's position relative to the insulating jacket on each said cable so as to maintain each corresponding sleeve in a substantially fixed position on said insulating jacket and to preclude axial movement of the sleeve toward the corresponding terminus of each said cable; and a pair of housing members having respective complementary portions for cooperation with one another in watertight sealing relationship to form an integral housing, each of said housing members having an internal bore extending therethrough from end to end and including a portion adjacent one end thereof defining said internal bore and being resiliently dilatable whereby each of said housing members may be slideably positioned over one of said cables and then slideably repositioned toward one another over said pair of sleeves for complementary engagement with one another to form said integral housing when said sleeves, said retaining members, and said contact means are assembled on said cables as hereinaforesaid and with said resiliently dilatable portions of each housing member respectively gripping the corresponding external surface of each sleeve in watertight sealing relationship therewith, each of said housing members having a second bore portion adjacent its other end for forming a sealed chamber enclosing at least said contact means and the exposed portions of said cable conductors when said housing members are in their repositioned locations forming said integral housing.

20. The invention of claim 19 wherein said sleeves in said pair each have a first portion of insulating elastomeric material, a second portion of conductive elastomeric material integral with and axially related to said first sleeve portion, and an axially extending external surface common to said first and second sleeve portions, said resiliently dilatable internal bore extending axially from end to end of the sleeve through both said first and second sleeve portions, said bore having an internal surface adjacent one end of the sleeve and coextensive with said first sleeve portion and at least part of said second sleeve portion, the relative dimensions of said internal surface and the outer surface of the insulating jacket being such that the bore at the internal surface thereof will be resiliently dilated and the corresponding portion of the sleeve will grip the insulating jacket to increase the dielectric strength of the creep path along said corresponding portion of the insulation jacket when each said sleeve is fitted over the insulating jacket on each of said cables respectively, and wherein each of said housing members includes an inner portion of insulating elastomeric material, an outer portion of conductive elastomeric material integral with said inner portion, each of said resiliently dilatable portions of said housing members being common with said inner and outer housing portions, the relative dimensions of said housing resiliently dilatable bore portions and said external surface of each corresponding sleeve being such that when each said housing member is slideably repositioned over said sleeves fitted on said cables, respectively, said housing bore portions will be dilated to grip said external surface of each corresponding sleeve in watertight sealing relationship therewith with said housing outer portion in electrical contact with the second portion of each corresponding sleeve.

21. The invention of claim 20 wherein the internal bore of each said sleeve includes a further internal surface adjacent the other end of the sleeve and coextensive with at least a portion of said second sleeve portion, the relative dimensions of said further internal surface and the outer surface of each of said cable's conductive shield being such that the bore at the further internal surface thereof will be resiliently dilated and the corresponding portion of the sleeve will grip the shield in electrical contact therewith when each said sleeve is fitted over the insulating jacket on each of said cables.

* * * * *